(12) United States Patent  
Tokieda et al.

(10) Patent No.: US 10,168,017 B2  
(45) Date of Patent: Jan. 1, 2019

(54) VEHICLE COMBINATION LAMP

(71) Applicant: Stanley Electric Co., Ltd., Tokyo (JP)

(72) Inventors: Yuki Tokieda, Tokyo (JP); Kazuya Furubayashi, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 159 days.

(21) Appl. No.: 15/188,369

(22) Filed: Jun. 21, 2016

(65) Prior Publication Data

US 2016/0369969 A1 Dec. 22, 2016

(30) Foreign Application Priority Data

Jun. 22, 2015 (JP) ................. 2015-124968

(51) Int. Cl.
```
F21S 43/237   (2018.01)
B60Q 1/26     (2006.01)
F21S 8/10     (2006.01)
B60Q 1/00     (2006.01)
F21S 43/249   (2018.01)
```

(52) U.S. Cl.
CPC ........ *F21S 48/2281* (2013.01); *B60Q 1/0047* (2013.01); *B60Q 1/2607* (2013.01); *F21S 43/249* (2018.01); *B60Q 2400/20* (2013.01); *B60Q 2400/30* (2013.01)

(58) Field of Classification Search
CPC .. F21S 48/2281; F21S 43/249; B60Q 1/0047; B60Q 1/2607
See application file for complete search history.

(56) References Cited

U.S. PATENT DOCUMENTS

2014/0160778 A1* 6/2014 Nakada ................. G02B 6/002  
    362/511  
2014/0301099 A1* 10/2014 Watanabe ............ B60Q 1/0041  
    362/511  
2015/0049504 A1* 2/2015 Wu ........................ F21S 41/19  
    362/517

FOREIGN PATENT DOCUMENTS

| EP | 2 354 637 A2 | 8/2011 |
| EP | 2 851 718 A1 | 3/2015 |
| GB | 2477616 A | 8/2011 |

(Continued)

OTHER PUBLICATIONS

Splice77: "2015 FL Audi A7 TDI 272 HP Tornado gray-with dynamic turning signal and LED"; youtube, Nov. 21, 2014. p. 1pp; XP054976888.

(Continued)

*Primary Examiner* — Bao Q Truong  
*Assistant Examiner* — Nathaniel Lee  
(74) *Attorney, Agent, or Firm* — Kenealy Vaidya LLP (57) ABSTRACT

A vehicle combination lamp including lamp units of high use efficiency can be provided. Among a plurality of lamp units constituting the combination lamp, a first lamp unit can be configured to include two types of light sources, namely, white light sources and orange light sources and a light guide bar that takes in light from the light sources and emits the light in a predetermined direction. White light and orange light that are emitted from the white light sources and the orange light sources, respectively, and guided through and emitted from the light guide bar can contribute to a DRL function and a turn signal lamp function, respectively.

12 Claims, 12 Drawing Sheets

(56) References Cited

FOREIGN PATENT DOCUMENTS

JP          2013-55004 A      3/2013

OTHER PUBLICATIONS

The extended European search report for the related European Patent Application No. 16175723.2 dated Nov. 15, 2016.

* cited by examiner

VEHICLE COMBINATION LAMP

This application claims the priority benefit under 35 U.S.C. § 119 of Japanese Patent Application No. 2015-124968 filed on Jun. 22, 2015, which is hereby incorporated in its entirety by reference.

TECHNICAL FIELD

The presently disclosed subject matter relates to a vehicle combination lamp, and more particularly to a vehicle combination lamp including a plurality of lamp units integrally fitted into one lamp chamber, the plurality of lamp units having respective different functions.

BACKGROUND

Among conventional combination lamps of this type, or combination lamps including a lamp unit having a DRL function in particular, is one disclosed in Japanese Patent Application Laid-Open No. 2013-055004 under the title of "VEHICLE LIGHTING FIXTURE INCLUDING A PLURALITY OF LAMP UNITS."

Figure 1:
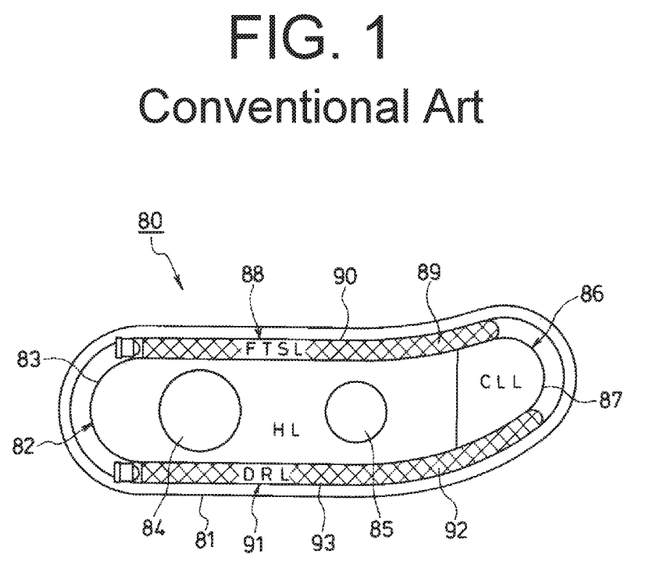
FIG. 1 is an explanatory diagram of a conventional example.

As shown in FIG. 1, the disclosed vehicle lighting fixture (headlamp) 80 includes a headlamp (HL) unit 82, a clearance lamp (CLL) unit 86, a front turn signal lamp (FTSL) unit 88, and a daytime running lamp (DRL) unit 91 which are arranged in a lamp housing 81. The CLL unit 86 is located on an outer side of the HT unit 82. The FTSL unit 88 is located above the HL unit 82. The DRL unit 91 is located below the HL unit 82.

The HL unit 82 includes a low beam lamp 84 and a high beam lamp 85 which are juxtaposed behind a laterally-long lens (HL lens) 83. The CLL unit 86 includes a lens (CLL lens) 87. The FTSL unit 88 includes a lens 90 which includes a slender light guide member 89 extending along the upper outlines of the HL lens 83 and the CLL lens 87. The DRL unit 91 includes a lens 93 which includes a slender light guide member 92 extending along the lower outlines of the HL lens 83 and the CLL lens 87.

In such a manner, the four lamp units 82, 86, 88, and 91 can be compactly arranged to look good in a front area of the laterally-long lamp housing 81. In particular, since the lens 90 of the FTSL unit 88 and the lens 93 of the DRL unit 91 are made of the slender light guide members 89 and 92, the outer ends of both the lenses 90 and 93 can be easily curved to match the housing shape for improved visibility from beside the vehicle.

According to the foregoing vehicle lighting fixture (headlamp) 80, the four lamp units 82, 86, 88, and 91 constituting the headlamp 80 have respective fixed lamp functions when turned on for running. Of these, the DRL unit 91 which is lit and used during daytime running is unlit during nighttime finning, or if lit for running, does not contribute to any lamp function. The lamp units constituting the headlamp 80, and the DRL unit 91 in particular, are therefore low in use efficiency and far from being fully utilized.

SUMMARY

The presently disclosed subject matter was devised in view of these and other problems and features in association with the conventional art. According to an aspect of the presently disclosed subject matter, a vehicle lighting fixture (combination lamp) can include lamp units of high use efficiency.

According to another aspect of the presently disclosed subject matter, a combination lamp can include a plurality of lamp units and a lamp chamber configured to accommodate the lamp units therein. In this combination lamp, at least one (first lamp unit) of the plurality of lamp units can include a plurality of types of light sources that can have different light emission colors and a light guide member configured to take in and guide light from the light sources and emit the light in a predetermined direction. In the combination lamp with this configuration, rays of light of different light colors that are emitted from the respective light sources having the different light emission colors and guided through and emitted from the light guide member can contribute to respective different lamp functions.

In the combination lamp with the above-described configuration, the plurality of types of light sources can include a white light source that can emit white light and an orange light source that can emit orange light, the white light that is emitted from the white light source and guided through and emitted from the light guide member can contribute to a DRL function, and the orange light that is emitted from the orange light source and guided through and emitted from the light guide member can contribute to a turn signal lamp function.

In the combination lamp with any of the above-described configurations, two lamp units that are a second lamp unit and a third lamp unit including respective light guide members among the plurality of lamp units can be accommodated in the lamp chamber with the first lamp unit, the second lamp unit and the third lamp unit can each include a white light source, and rays of white light that are emitted from the respective white light sources and guided through and emitted from the respective light guide members of the second lamp unit and the third lamp unit can contribute to a DRL function.

In the combination lamp with the above-described configuration, the first lamp unit and either one of the second lamp unit and the third lamp unit both can have a light distribution pattern in which a maximum luminous intensity is located near an intersection of a horizontal reference line and a vertical reference line, and the other of the second lamp unit and the third lamp unit can have a light distribution pattern in which a maximum luminous intensity is located in a horizontally shifted position with respect to the light distribution pattern of the one of the second lamp unit and the third lamp unit.

According to the presently disclosed subject matter, at least one of the plurality of lamp units constituting the combination lamp can include a plurality of types of light sources that can have different light emission colors and a light guide member configured to take in the light from the light sources and emit the light in a predetermined direction. Rays of light of different light colors that are emitted from the respective light sources having the different light emission colors and guided through and emitted from the light guide member can contribute to respective different lamp functions.

Consequently, a combination lamp including lamp units of high use efficiency can be constructed.

BRIEF DESCRIPTION OF DRAWINGS

These and other characteristics, features, and advantages of the presently disclosed subject matter will become clear from the following description with reference to the accompanying drawings, wherein.

DESCRIPTION OF EXEMPLARY EMBODIMENTS

A preferred exemplary embodiment of the presently disclosed subject a will be described in detail below with reference to FIGS. 2 to 17 (similar portions will be designated by the same reference numerals).

Figure 2:
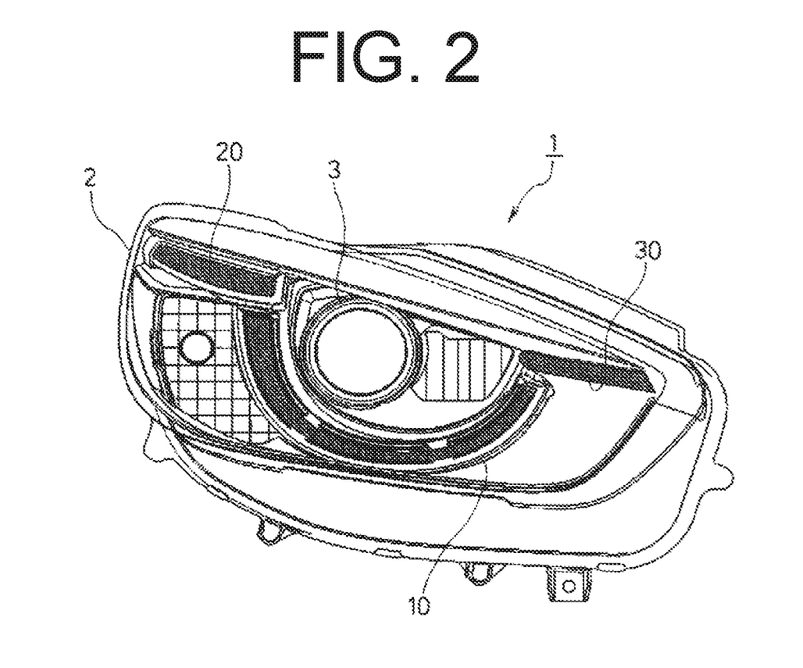
FIG. 2 is a perspective view of a combination lamp according to an exemplary embodiment made in accordance with principles of the presently disclosed subject matter.

FIG. 2 is a perspective view of a vehicle combination lamp (hereinafter, referred to for short as a "combination lamp") according to the exemplary embodiment of the presently disclosed subject matter.

A combination lamp (front combination lamp) 1 according to the exemplary embodiment can include a headlamp unit 3 configured to form a high beam light distribution pattern and a low beam light distribution pattern. The headlamp unit 3 can be located in a center of a housing 2. The combination lamp 1 can further include a semi-annular first lamp unit 10 that can extend along an outer periphery of the headlamp unit 3 and be located on the outer periphery which stretches from below the headlamp unit 3 to both lateral sides. The combination lamp 1 can further include a second lamp unit 20 and a third lamp unit 30 that can extend along an upper edge of the housing 2 in opposite directions (outward direction and inward direction) and be arranged near respective ends of the first lamp unit 10.

In terms of the combination lamp mounted on a vehicle, the foregoing "outward direction" and "inward direction" may refer to a "lateral side of the vehicle" and a "center side of the vehicle," respectively.

The first lamp unit 10, the second lamp unit 20, and the third lamp unit 30 can each include a light guide member. The light guide members of the first lamp unit 10 and the second lamp unit 20 can be light guide bars of bar shape. The light guide member of the third lamp unit 30 can be a light guide plate of flat plate shape.

A configuration of each of the first lamp unit 10, the second lamp unit 20, and the third lamp unit 30 will next be described below.

Figure 3:
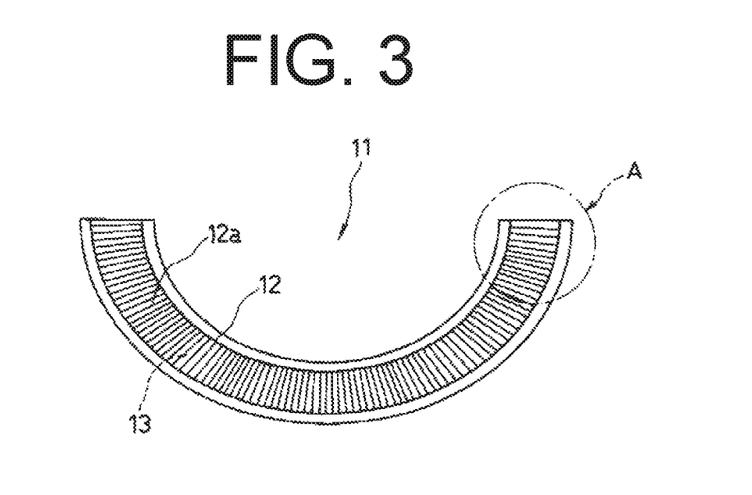
FIG. 3 is a plan view of a light guide bar of a first lamp unit.
Figure 4:
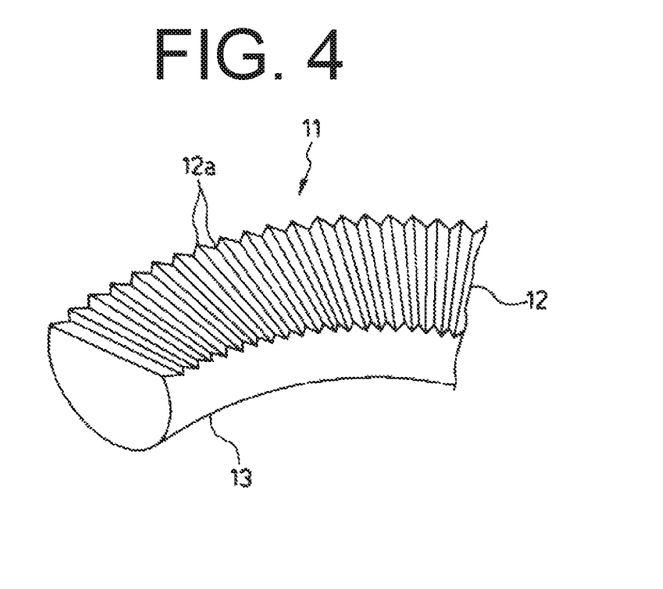
FIG. 4 is a perspective view of a portion A of FIG. 3.

As shown in FIG. 3 (plan view) and FIG. 4 (perspective view of a portion A of FIG. 3), the first lamp unit 10 can include a light guide bar 11 which is formed by curving a generally cylindrical light guide member into a semi-annular shape. The light guide bar 11 can include a light reflection portion 12 and a light emission reflection portion 13. The light reflection portion 12 can be an internal reflection surface (total reflection surface) formed in part of the outer peripheral surface, and extend along the extending direction of the semi-annular shape. The light emission reflection portion 13 can be a surface opposite to the light reflection portion 12.

For example, the light reflection portion 12 can include an internal reflection surface where triangular projections and depressions 12a extending perpendicularly to the extending direction of the light guide bar 11 can be continuously juxtaposed in the extending direction.

A substrate 6 on which a semiconductor light source 5 is mounted can be arranged near either one or both of end faces of the light guide bar 11. The semiconductor light source 5 can be configured so that semiconductor light emitting elements (for example, LED elements) serving as light emission sources are accommodated in a package (see FIG. 5 (relationship diagram of the light guide bar and a light source)).

Figure 5:
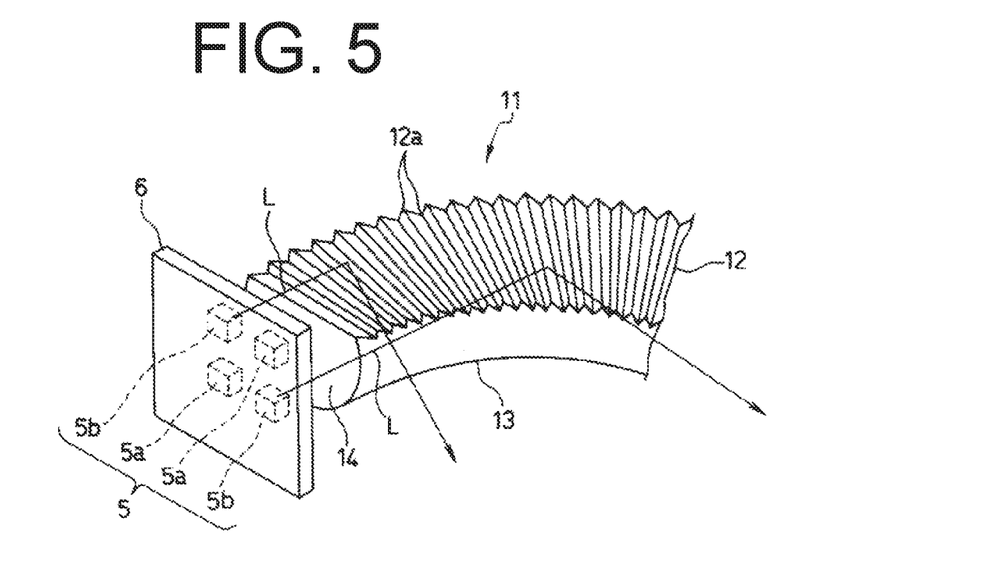
FIG. 5 is a relationship diagram of the light guide bar and a light source.

The semiconductor light source (hereinafter, referred to for short as a "light source") 5 mounted on the substrate 6 can include a plurality of types of light sources which emit light of different hues. In the present exemplary embodiment, two white light sources 5a for emitting white light and two orange light sources 5b for emitting orange light be arranged diagonally to each other.

Light L emitted by turning on either the two white light sources 5a or the two orange light sources 5b can enter the interior of the light guide bar 11 from a light incident surface 14. The light incident surface 14 can be an end face of the light guide bar 11 opposed to the light source 5. The light L entering the interior of the light guide bar 11 can repeat internal reflection (total reflection) between the light emission reflection portion 13 and the light reflection portion 12 while being guided toward the other end face. In the process, part of reflection light internally reflected by the light reflection portion 12 can be emitted outward from the light emission reflection portion 13.

The light guided through the light guide bar 11 can reach the light reflection surfaces of the triangular projections and depressions 12a located in respective different positions in respective different directions and be reflected by light reflection surfaces. The reflected light can constitute the emission light emitted outward from the light emission reflection portion 13. The emission light can thus be projected not in a specific direction but in a predetermined wide range of directions as diffused light.

The two white light sources 5a and the two orange light sources 5b can be diagonally arranged to be symmetrical to each other. A light distribution pattern formed by the projection light of the white light sources 5a and a light distribution pattern formed by the projection light of the orange light sources 5b therefore can have almost the same shape.

Figure 6:
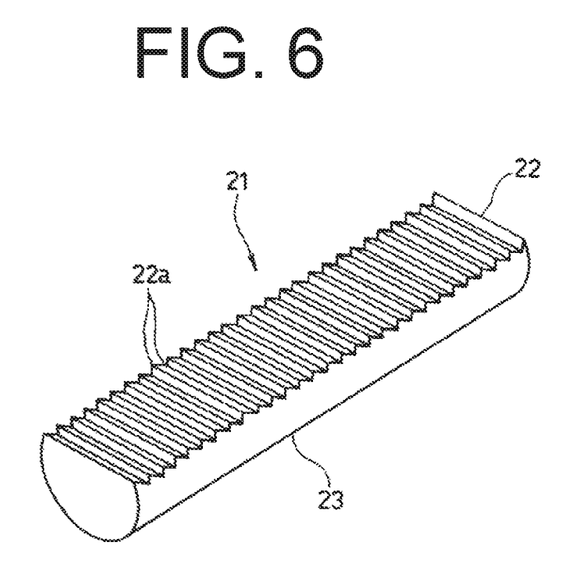
FIG. 6 is a perspective view of a light guide bar of a second lamp unit.
Figure 7:
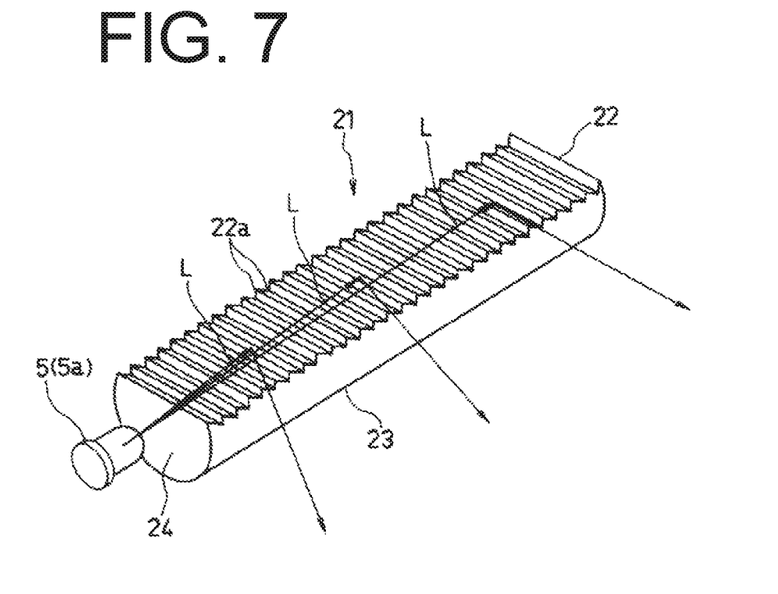
FIG. 7 is a relationship diagram of the light guide bar and a light source.

As shown in FIG. 6 (perspective view) and FIG. 7 (relationship diagram of a light guide bar and a light source), the second lamp unit 20 can include a light guide bar 21 like the foregoing first lamp unit 10. The light guide bar 21 of the second lamp unit 20 can differ from the light guide bar 11 of the first lamp unit 10 in that the light guide bar 21 of the second lamp unit 20 can be formed as a generally cylindrical light guide member of straight shape while the light guide bar 11 of the first lamp unit 10 can be formed by curving a generally cylindrical light guide member into the semi-annular shape.

The light guide bar 21 can include a light reflection portion 22 and a light emission reflection portion 23. The light reflection portion 22 can be an internal reflection surface (total reflection surface) formed in part of the outer peripheral surface of the light guide bar 21, and extend along the extending direction of the straight shape. The light emission reflection portion 23 can be a surface opposite to the light reflection portion 22.

For example, the light reflection portion 22 can include an internal reflection surface where triangular projections and depressions 22a extending perpendicularly to the extending direction of the light guide bar 21 are continuously juxtaposed in the extending direction.

A semiconductor light source 5 can be arranged near either one or both of end faces of the light guide bar 21. The semiconductor light source 5 can be configured so that a semiconductor light emitting element (for example, LED element) serving as a light emission source is accommodated in a package. In the present exemplary embodiment, the semiconductor light source 5 can include a white light source 5a for emitting white light.

Light L emitted by turning on the light source 5 can enter the interior of the light guide bar 5 from a light incident surface 24. The light incident surface 24 can be an end face of the light guide bar 21 opposed to the light source 5. The light L entering the interior of the light guide bar 21 can repeat internal reflection (total reflection) between the light emission reflection portion 23 and the light reflection portion 22 while being guided toward the other end face. In the process, part of reflection light internally reflected by the light reflection portion 22 can be emitted outward from the light emission reflection portion 23.

The light guided through the light guide bar 21 can reach the light reflection surfaces of the triangular projections and depressions 22a located in respective different positions in respective different directions and be reflected by the light reflection surfaces. The reflected light can constitute the emission light emitted outward from the light emission reflection portion 23. The emission light can thus be projected not in a specific direction but in a predetermined wide range of directions as diffused light.

Unlike the foregoing first and second lamp units 10 and 20, the third lamp unit 30 can include a light guide plate 31 of flat plate shape.

Figure 8:
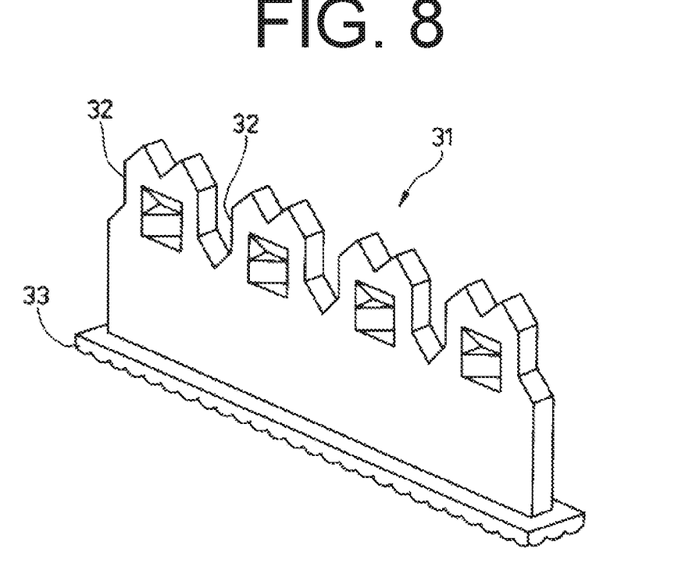
FIG. 8 is a perspective view of a light guide plate of a third lamp unit.

As shown in FIG. 8 (perspective view), the light guide plate 31 can include a plurality of integrally-formed light incident guide portions 32, and a light emission portion 33 integrally formed with the light incident guide portions 32.

Figure 9:
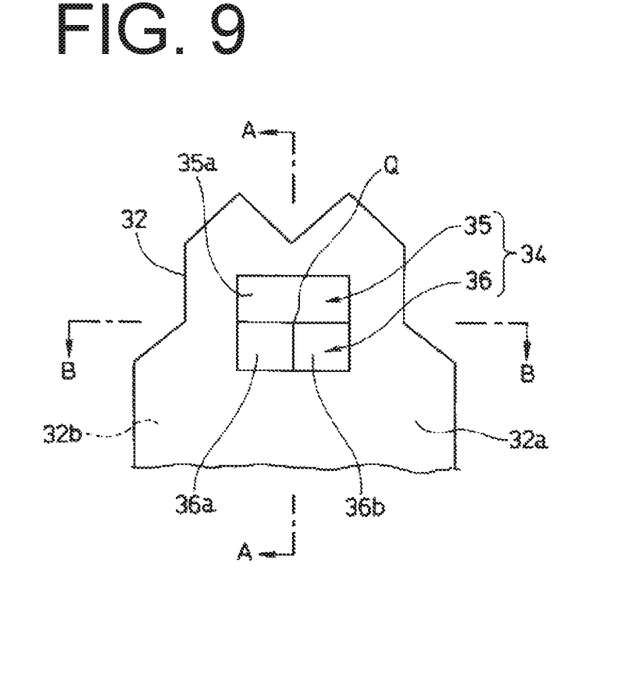
FIG. 9 is a partial front view of FIG. 8.
Figure 10:
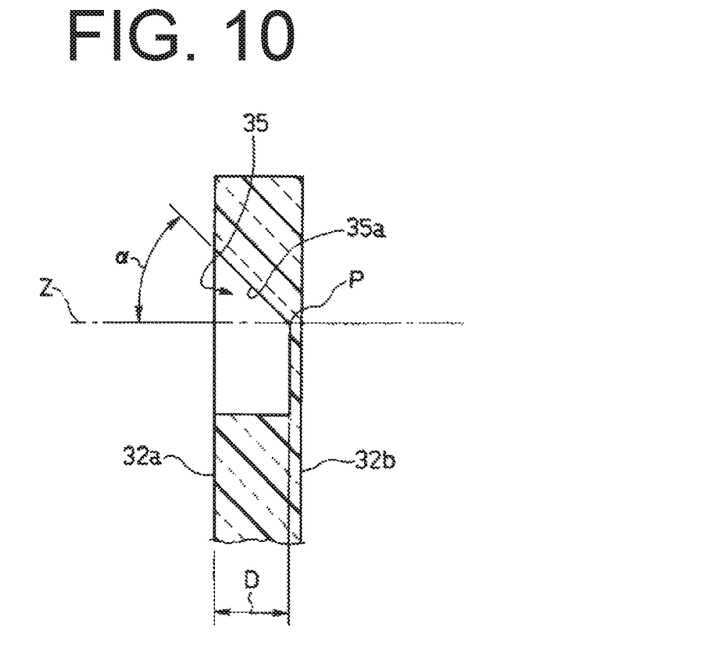
FIG. 10 is a sectional view taken along the line A-A of FIG. 9.
Figure 11:
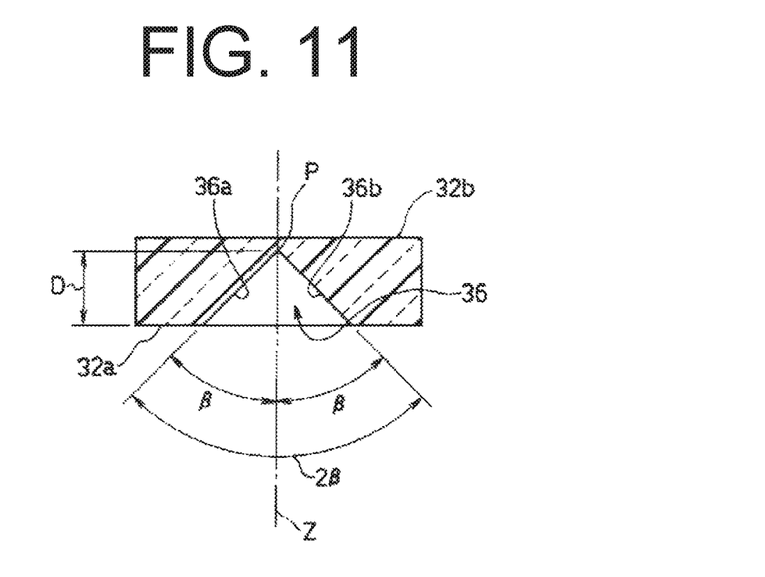
FIG. 11 is a sectional view taken along the line B-B of FIG. 9.

As shown in FIG. 9 (partial front view of FIG. 8), notch holes 34 can be formed in one face (surface) 32a side of the light incident guide portions 32. Each notch hole 34 can include an inclined notch portion 35 and a wedge notch portion 36. The inclined notch portion 35 can be obliquely formed into the surface 32a toward a rear surface 32b at a predetermined angle α to reach an extension of a center axis Z, and can have an inclined notch surface 35a of flat shape (see FIG. 10 (sectional view taken along the line A-A of FIG. 9). The wedge notch portion 36 can be located on an opposite side of the extension of the center axis Z from the inclined notch portion 35. The wedge notch portion 36 can be formed into the surface 32a toward the rear surface 32b in a wedge-like shape with a predetermined width D and a predetermined angle 2β, and can have a pair of wedge notch surfaces 36a and 36b of flat shape (see FIG. 11 (sectional view taken along the line B-B of FIG. 9)). The angle β is the oblique angle of each of the wedge notch surfaces 36a and 36b with respect to the direction of the center axis Z. The inclined notch surface 35a and the wedge notch surfaces 36a and 36b can be configured so that an edge line of the inclined notch surface 35a and the line of intersection between the pair of wedge notch surfaces 36a and 36b intersect at one point P on the extension of the center axis Z.

As shown in FIG. 9, if the light incident guide portion 32 is viewed from the surface 32a side, the notch hole 34 can appear rectangular in shape with the extension of the center axis Z as a center point Q. The notch hole 34 can expose the inclined notch surface 35a on the far side of the inclined notch portion 35 formed on one side (upper side) of the center point Q about the center axis Z. The notch hole 34 can expose the pair of wedge notch surfaces 36a and 36b on the far side of the wedge notch portion 36 formed on the other side (lower side).

Figure 12:
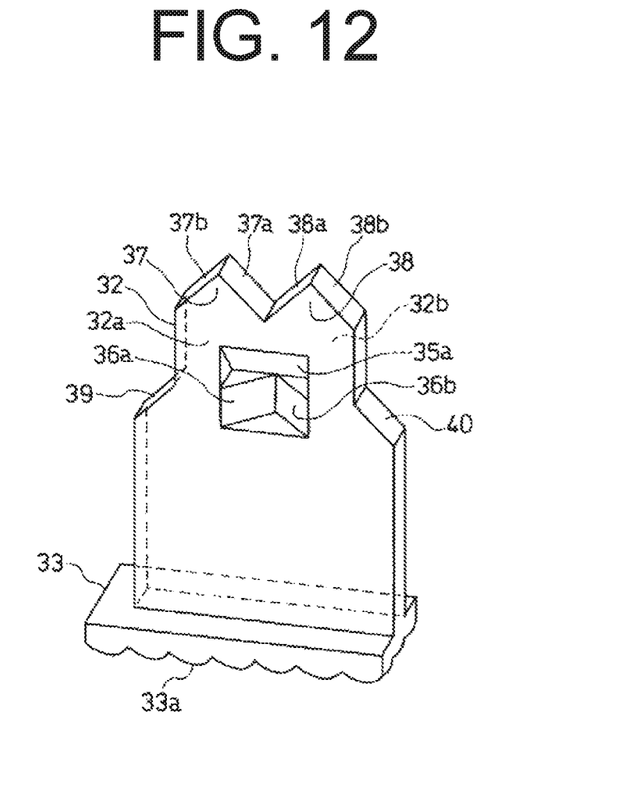
FIG. 12 is a perspective view of a light incident guide portion.

As shown in FIG. 12 (perspective view of the light incident guide portion), two triangular-shaped prism portions (triangular prism portions) including a first prism portion 37 and a second prism portion 38 can be arranged obliquely above both sides of the inclined notch surface 35a. The first and second prism portions 37 and 38 can have the same shape protruding upward at a predetermined angle and be arranged next to each other at the same height. The prism portions 37 and 38 can include surfaces (first prism surfaces) 37a and 38a that are opposed to each other, and surfaces (second prism surfaces) 37b and 38b that face in respective opposite directions.

Side inclined surfaces 39 and 40 spreading out downward at a predetermined angle can be formed beside the pair of wedge notch surfaces 36a and 36b, respectively.

The light emission portion 33 of generally flat plate shape perpendicular to the direction of the plane of the light incident guide portions 32 can be integrally formed on one end (lower part) of the series of light incident guide portions 32. Appropriately lens cuts can be formed in a lower surface (surface opposite from the light incident guide portions 32, serving as a light emission surface) 33a of the light emission portion 33 so that emitted light travels a predetermined direction.

Next, the light guide plate 31 having the foregoing configuration will be described in optical terms with reference to FIG. 13 (ray tracing diagram) and FIG. 14 (ray tracing diagram).

Suppose that light is emitted from a light source 5 arranged behind the notch hole 34 of a light incident guide portion 32 and travels toward the light incident guide portion 32 in a direction perpendicular to the direction of the plane of the light incident guide portion 32. The light can enter the interior of the light incident guide portion 32 from the side (rear side) 32b opposed to the light source 5.

Figure 13:
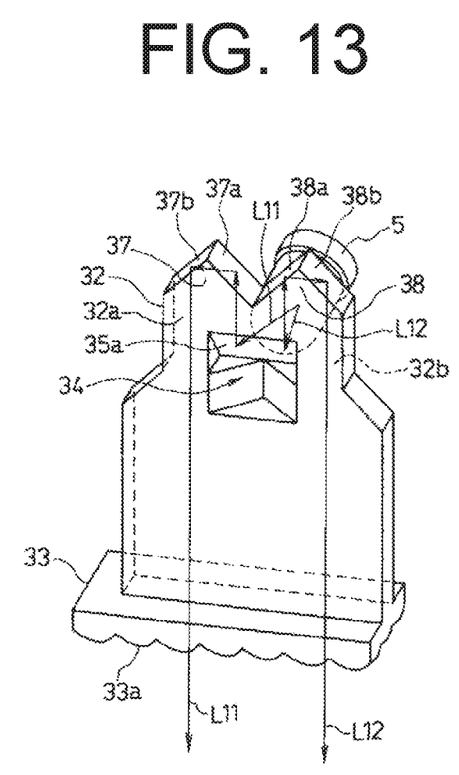
FIG. 13 is a ray tracing diagram.
Figure 14:
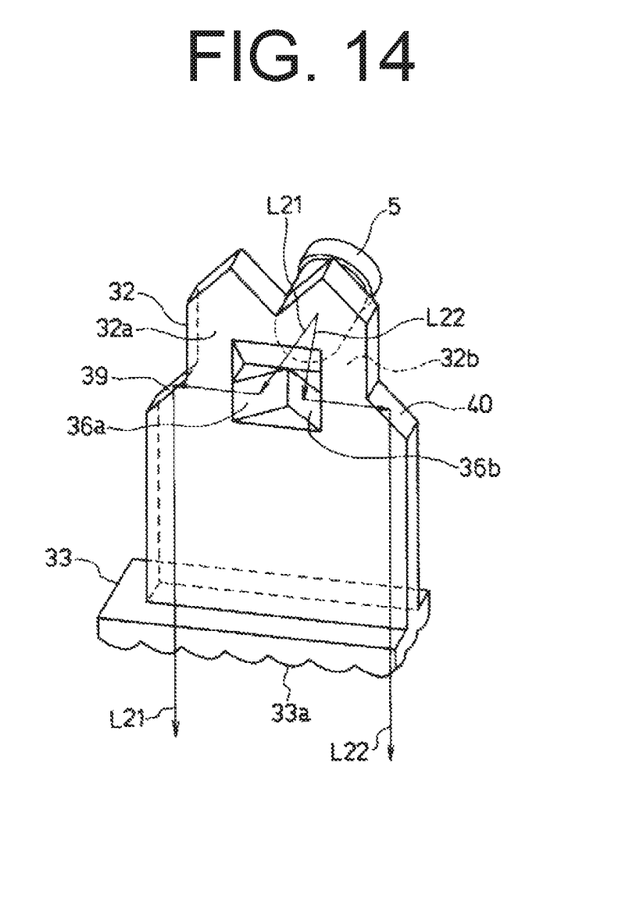
FIG. 14 is a ray tracing diagram.

As shown in FIG. 13, rays of light L11 and L12 traveling from the light source 5 toward the upper half of the notch hole 34 can be guided inside the light incident guide portion 32 to reach the inclined notch surface 35a. The rays of light L11 and L12 can be internally totally reflected (hereinafter, referred to as "internally reflected") by the inclined notch surface 35a and guided inside the light incident guide portion 32 toward the first prism surfaces 37a and 38a of the first and second prism portions 37 and 38 located above, respectively.

The light L11 reaching the first prism surface 37a of the first prism portion 37 can be internally reflected by the first prism surface 37a and guided inside the first prism portion 37 toward the second prism surface 37b. The light L11 can be internally reflected by the second prism surface 37b and guided inside the light incident guide portion 32 toward the light emission portion 33 located below. The light L11 can be emitted outward in a predetermined direction from the lower surface (light emission surface) 33a of the light emission unit 33.

The light L12 reaching the first prism surface 38a of the second prism portion 38 can be internally reflected by the first prism surface 38a and guided inside the second prism portion 38 toward the second prism surface 38b. The light L12 can be internally reflected by the second prism surface 38b and guided inside the light incident guide portion 32 toward the light emission portion 33 located below. The light L12 can be emitted outward in a predetermined direction from the lower surface (light emission surface) 33a of the light emission unit 33.

Rays of light L21 and L22 traveling from the light source 5 toward the lower half of the notch hole 34 will be described. As shown in FIG. 14, the light L21 emitted toward one of the lateral halves can be guided inside the light incident guide portion 32 to reach the wedge notch surface 36a. The light L21 can be internally reflected by the wedge notch surface 36a and guided inside the light incident guide portion 32 toward the side inclined surface 39 located on the side. The light L21 can be internally reflected by the side inclined surface 39 and guided inside the light incident guide portion 32 toward the light emission portion 33 located below. The light L21 can be emitted outward in a predetermined direction from the lower surface (light emission surface) 33a of the light emission portion 33.

The light L22 emitted from the light source 5 toward the other lateral half can be guided inside the light incident guide portion 32 to reach the wedge notch surface 36b. The light L22 can be internally reflected by the wedge notch surface 36b and guided inside the light incident guide portion 32 toward the side inclined surface 40 located on the side. The light L22 can be internally reflected by the side inclined surface 40 and guided inside the light incident guide portion 32 toward the light emission portion 33 located below. The light L21 can be emitted outward in a predetermined direction from the lower surface (light emission surface) 33a of the light emission portion 33.

Consequently, light emitted from the light sources 5 and incident on the respective light incident guide portions 32 can reach the light emission portion 33 after internal reflection (total reflection) three times at most. This can suppress light loss because light reflected by internal reflection travels in directions other than a predetermined direction. A favorable light use efficiency can thus be obtained.

The optical paths inside the light incident guide portions 32 through which the light that is emitted from the light source 5 and has entered the interior of the light incident guide portion 32 is guided can be limited. The light guided through the light incident guide portions 32 can reach the light emission portion 33 as generally parallel light. This can reduce the diffusivity of the light emitted from the light emission portion 33, and can limit the projection range of the emitted light.

Figure 15:
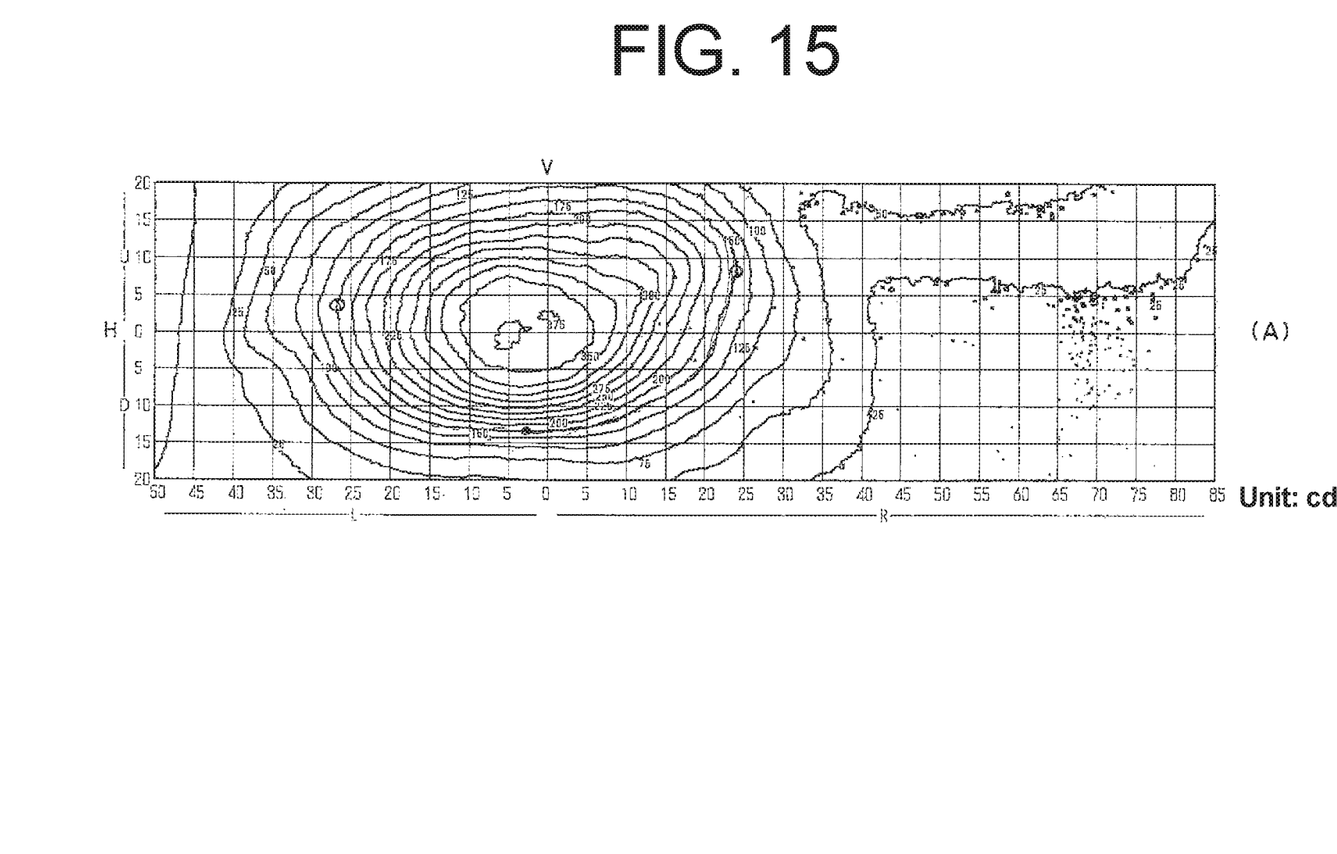
FIG. 15 is a chart showing a light distribution pattern of the first lamp unit.
Figure 16:
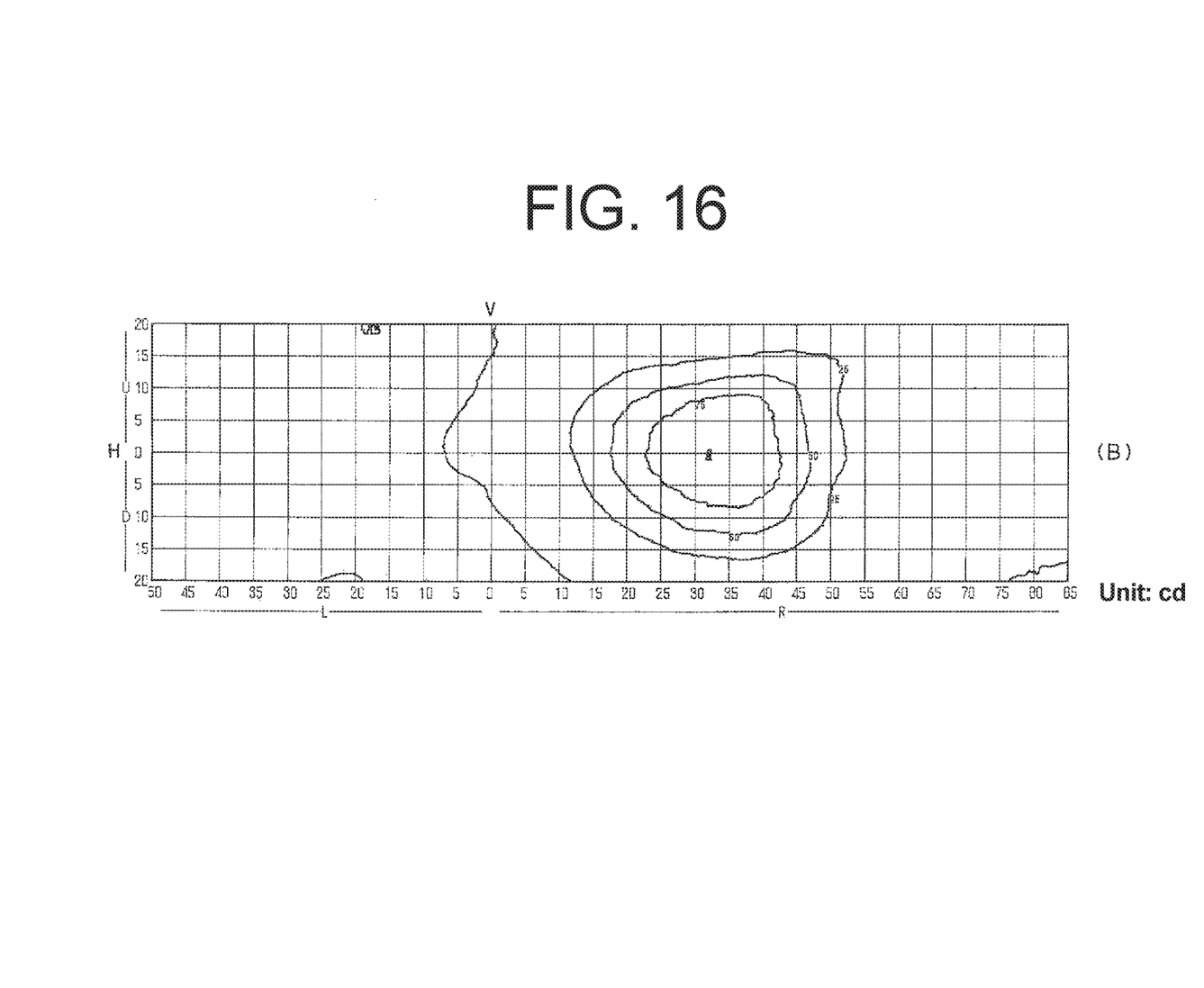
FIG. 16 is a chart showing a light distribution pattern of the second lamp unit.
Figure 17:
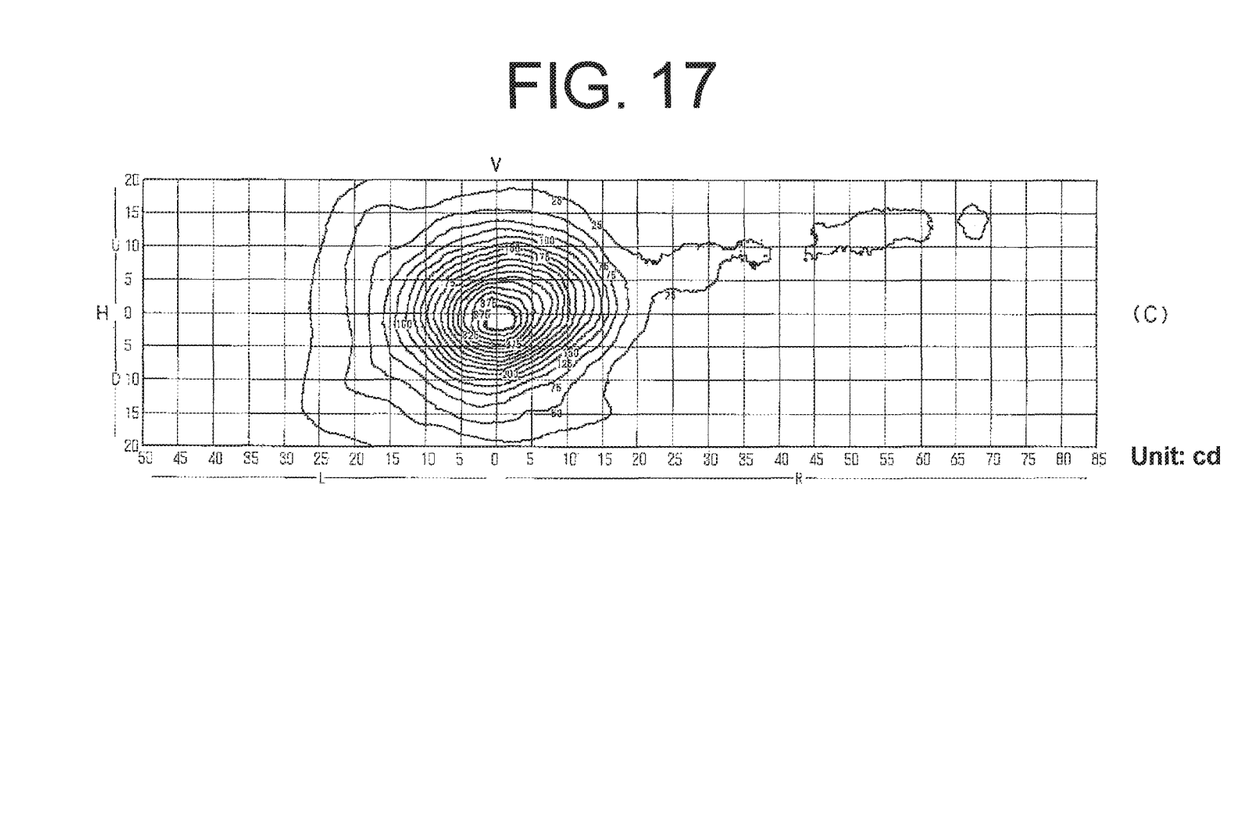
FIG. 17 is a chart showing a light distribution pattern of the third lamp unit.

FIGS. 15 to 16 show light distribution patterns formed by projection light of the foregoing first, second, and third lamp units 10, 20, and 30, respectively. The first, second, and third lamp units 10, 20, and 30 can each be appropriately adjusted in orientation to set a projection direction.

A light distribution pattern (A) formed by the projection light of the first lamp unit 10 can have a maximum luminous intensity of approximately 380 cd near the position where a horizontal reference line H intersects with a vertical reference line V. Isophotal contours (at pitches of 25 cd) can be formed like ripples around the position. The range of 150 cd in luminous intensity can be vertically (U-D) between approximately 20.0° (U) and approximately 13.2° (D) with respect to the horizontal reference line H, and laterally (L-R) between approximately 26.7° (L) and approximately 24.0° (R) with respect to the vertical reference line V.

A light distribution pattern (C) formed by the projection light of the third lamp unit 30 can have a maximum luminous intensity at almost the same position as with the foregoing first lamp unit 10, i.e., near the position where the horizontal reference line H intersects with the vertical reference line V. The maximum luminous intensity at that position can be approximately 450 cd. Isophotal contours (at pitches of 25 cd) can be formed like ripples around the position. The range of 50 cd in luminous intensity can be vertically (U-D) between approximately 15.6° (U) and approximately 16.4° (D) with respect to the horizontal reference line H, and laterally (L-R) between approximately 18.0° (L) and approximately 18.6° (R) with respect to the vertical reference line V.

The light distribution pattern (A) formed by the projection light of the first lamp unit 10 and the light distribution pattern (C) formed by the projection light of the third lamp unit 30 will be compared. Both the light distribution patterns (A) and (C) can have a maximum luminous intensity at almost the same position. The light distribution pattern (C) can have a higher maximum luminous intensity and narrower isophotal contours as compared to those of the light distribution pattern (A). In other words, the projection light of the first lamp unit 10 can be controlled to be widely diffused about near the intersection of the reference lines (H-V) in the light distribution pattern (A). The projection light of the third lamp unit 30 can be controlled to concentrate near the intersection of the reference lines (H-V) in the light distribution pattern (C).

A light distribution pattern (B) formed by the projection light of the second lamp unit 20 can have a maximum luminous intensity of approximately 100 cd at a position where a line of approximately 1° (D) with respect to the horizontal reference line H intersects with a line of approximately 30° (R) with respect to the vertical reference line V. Isophotal contours (at pitches of 25 cd) can be formed like ripples around the position. The range of 25 cd in luminous intensity can be vertically (U-D) between approximately 15.8° (U) and approximately 16.5° (D) with respect to the horizontal reference line H, and laterally (L-R) between approximately 18.5° (L) and approximately 52° (R) with respect to the vertical reference line V.

As compared to the light distribution pattern (A) of the first lamp unit 10 and the light distribution pattern (C) of the third lamp unit 30, the center position (position of the maximum luminous intensity) of the light distribution pattern (B) formed by the projection light of the second lamp unit 20 can be laterally (L-R) shifted to the right (R).

Lamp functions for the respective first, second, and third lamp units 10, 20, and 30 to perform will be described.

Initially, suppose that the white light sources among the white and orange light sources arranged in the first lamp unit 10 are driven and the light sources of the respective first, second, and third lamp units 10, 20, and 30 are simultaneously lit in white. The three lamp units 10, 20, and 30 can thereby constitute a DRL (daytime running lamp) for daytime running.

In such a case, a light distribution standard required of the DRL is satisfied by the superposed light obtained by superposing the projection light of the first lamp unit 10 and that of the third lamp unit 30. The projection light of the second lamp unit 20 can be projected sideways from the vehicle to call attention of pedestrians on the shoulder of the road for the presence of the running vehicle. During nighttime running, all the lamp units 10, 20, and 30 can be turned off or dimmed to provide a function of a clearance lamp.

The orange light sources among the white and orange light sources arranged in the first lamp unit 10 can be used to blink the first lamp unit 10 in orange to provide front turn signal lamp. The second unit 20 and the third lamp unit 30 can be simultaneously lit in white so that the two lamp units 20 and 30 provide the function of the DRL for daytime running.

In such a case, the light distribution standard required of a front turn signal lamp is satisfied by the projection light of the first lamp unit 10. The light distribution standard required of a DRL is satisfied by the projection light of the third lamp unit 30. The second lamp unit 20 can be used to call attention of pedestrians on the shoulder for the presence of the running vehicle. During nighttime driving, the two lamp units 20 and 30 can be turned off or can be dimmed to provide the function of a clearance lamp.

The first lamp unit 10 can have both the DRL function and the front turn signal lamp function. Specifically, the orange light sources of the first lamp unit 10 can be used to blink the first lamp unit 10 in orange to provide the function of a front turn signal lamp. The white light sources of the first lamp unit 10 can be simultaneously turned on to constitute a DRL with the second and third lamp units 20 and 30. That is, the white light sources and the orange light sources of the first lamp unit 10 can be simultaneously lit to simultaneously provide the different functions depending on the color of the emitted light.

Even in such a case, during daytime running, the DRL function can be provided by the configuration including the first lamp unit 10 using the white light sources, the second lamp unit 20, and the third lamp unit 30. During nighttime driving, the lamp units can be turned off, or can be dimmed to provide the function of a clearance lamp.

Neither the light reflection portion 12 of the light guide bar 11 of the first lamp unit 10 nor the light reflection portion 22 of the light guide bar 21 of the second lamp unit 20 is necessarily limited to the shape of continuously juxtaposed triangular projections and depressions, as long as desired optical path control can be performed on the emission light.

The second lamp unit 20 is not necessarily limited to the configuration including the combination of the semiconductor light source 5 and the light guide bar 21. For example, the second lamp unit 20 can include a combination of an electrical bulb and a reflector.

In the first lamp unit 10, the light guide bar 11 formed to curve in the semi-annular shape can be divided in two and configured to include two light guide bars of generally quarter annular shape. White and orange light sources can be arranged on each of the light guide bars. This can suppress attenuation of the amount of light in positions of the light guide bar far from the light sources, whereby luminance variations of the emission light are reduced.

As described above, the combination lamp according to the foregoing exemplary embodiment of the presently disclosed subject matter can be configured so that the first lamp includes two types of light sources having respective different light emission colors, namely, the white light sources and orange light sources. White light from the white light sources can be used to provide the DRL function. Orange light from the orange light sources can be used to provide the front turn signal lamp function.

Consequently, a combination lamp including lamp units of high use efficiency can be provided.

It will be apparent to those skilled in the art that various modifications and variations can be made in the presently disclosed subject matter without departing from the spirit or scope of the presently disclosed subject matter. Thus, it is intended that the presently disclosed subject matter cover the modifications and variations of the presently disclosed subject matter provided they come within the scope of the appended claims and their equivalents. All related art references described above are hereby incorporated in their entirety by reference.

What is claimed is:

1. A vehicle combination lamp comprising a plurality of lamp units and a lamp chamber configured to accommodate the lamp units therein, wherein the plurality of lamp units includes at least a first lamp unit having an end portion and a second lamp unit disposed at or near the end portion of the first lamp unit, the first lamp unit includes a bar-shaped light guide member, and a light source including a first light emitting element that has white light emission color and a second light emitting element that has different light emission color from the first light emitting element, the light source being disposed at or near the end portion of the light guide member, the light guide member of the first lamp unit includes a light incident surface opposed to the light source, a light reflection portion formed in part of an outer peripheral surface thereof and extending along an extending direction of the light guide member, and a light emission reflection portion opposite to the light reflection portion, the light source of the first lamp unit includes a substrate on which the first and second light emitting elements are mounted so that the first and second light emitting elements having different light emission colors are opposed to the light incident surface, the first lamp unit is configured to emit white light when the first light emitting element is turned on to emit white light and the white light is guided through the light guide member and output through the light emission reflection portion as well as to emit different color light when the second light emitting element is turned on to emit different color light from the white light and the different color light is guided through the light guide member and output through the light emission reflection portion, so that the white light and the different color light impart different lamp functions to the first lamp unit, a light distribution pattern formed by the white light from the first lamp unit has a maximum luminous intensity near a position where a horizontal reference line H intersects with a vertical reference line V wherein a range of 150 cd in luminous intensity for irradiation expands vertically more upward than downward with respect to the horizontal reference line H and laterally wider than about 24°, the second lamp unit includes a second light guide member including a light incident surface, and a second light source including a light emitting element that has white light emission color, the second light source being disposed to be opposed to the light incident surface of the second light guide member, and a light distribution pattern formed by the white light from the second lamp unit has a maximum luminous intensity lower than the maximum luminous intensity formed by the white light from the first lamp unit and located in a horizontally shifted position with respect to the light distribution pattern of the first lamp unit.

2. The vehicle combination lamp according to claim 1, wherein the light source of the first lamp unit includes a white light source that includes the first light emitting element and can emit white light and an orange light source that includes the second light emitting element and can emit orange light, the white light that is emitted from the white light source and guided through and emitted from the light guide member contributes to a DRL function, and the orange light that is emitted from the orange light source and guided through and emitted from the light guide member contributes to a turn signal lamp function.

3. The vehicle combination lamp according to claim 2, further comprising:

a third lamp unit including a third light guide member separately provided from the light guide member and the second light guide member and including a light incident surface, and a third light source including a light emitting element that has white light emission color, and a light distribution pattern formed by the white light from the third lamp unit has a maximum luminous intensity higher than the maximum luminous intensity formed by the white light from the second lamp unit, the light distribution pattern formed by the white light from the third lamp unit being located near the position where the horizontal reference line H intersects with the vertical reference line V and expanding narrower than the light distribution pattern formed by the white light from the first lamp unit.

4. The vehicle combination lamp according to claim 3, wherein the first lamp unit, the second lamp unit, and the third lamp unit are accommodated in the lamp chamber, the second lamp unit and the third lamp unit each include a white light source including the light emitting unit, and rays of white light that are emitted from respective white light sources and guided through and emitted from the second and third light guide members of the second lamp unit and the third lamp unit contribute to a DRL function.

5. The vehicle combination lamp according to claim 4, wherein the second lamp unit has one end portion located near one of end faces of the first lamp unit, and the third lamp unit has one end portion located near an other end face of the first lamp unit.

6. The vehicle combination lamp according to claim 1, further comprising:

a third lamp unit including a third light guide member separately provided from the light guide member and the second light guide member and including a light incident surface, and a third light source including a light emitting element that has white light emission color unit, and a light distribution pattern formed by the white light from the third lamp unit has a maximum luminous intensity higher than the maximum luminous intensity formed by the white light from the second lamp unit, the light distribution pattern formed by the white light from the third lamp unit being located near the position where the horizontal reference line H intersects with the vertical reference line V and expanding narrower than the light distribution pattern formed by the white light from the first lamp unit.

7. The vehicle combination lamp according to claim 6, wherein the first lamp unit, the second lamp unit, and the third lamp unit are accommodated in the lamp chamber, the second lamp unit and the third lamp unit each include a white light source including the light emitting unit, and rays of white light that are emitted from respective white light sources and guided through and emitted from the second and third light guide members of the second lamp unit and the third lamp unit contribute to a DRL function.

8. The vehicle combination lamp according to claim 7, wherein the second lamp unit has one end portion located near one of end faces of the first lamp unit, and the third lamp unit has one end portion located near an other end face of the first lamp unit.

9. The vehicle combination lamp according to claim 6, configured to achieve a DRL function by rays of the white light that are emitted from respective light sources and guided through and emitted from the second and third light guide members of the second lamp unit and the third lamp unit that are simultaneously turned on.

10. The vehicle combination lamp according to claim 9, wherein the second lamp unit has one end portion located near one of end faces of the first lamp unit, and the third lamp unit has one end portion located near an other end face of the first lamp unit.

11. The vehicle combination lamp according to claim 9, wherein the third light guide member of the third lamp unit has a flat plate shape and has a light emission surface at one end face in a plane direction of the flat plate shape.

12. The vehicle combination lamp according to claim 6, wherein the third light guide member of the third lamp unit has a flat plate shape and has a light emission surface at one end face in a plane direction of the flat plate shape.

* * * * *